US007261430B1

(12) United States Patent
DeNatale et al.

(10) Patent No.: US 7,261,430 B1
(45) Date of Patent: Aug. 28, 2007

(54) THERMAL AND INTRINSIC STRESS COMPENSATED MICROMIRROR APPARATUS AND METHOD

(75) Inventors: Jeffrey F. DeNatale, Thousand Oaks, CA (US); Philip A. Stupar, Oxnard, CA (US); Chialun Tsai, Thousand Oaks, CA (US); Robert L. Borwick, III, Thousand Oaks, CA (US)

(73) Assignee: Teledyne Licensing, LLC, Thousand Oaks, CA (US)

(*) Notice: Subject to any disclaimer, the term of this patent is extended or adjusted under 35 U.S.C. 154(b) by 52 days.

(21) Appl. No.: 11/360,165

(22) Filed: Feb. 22, 2006

(51) Int. Cl.
*G02B 7/182* (2006.01)
*G02B 5/132* (2006.01)
*G02B 26/00* (2006.01)

(52) U.S. Cl. ...................... 359/871; 359/872; 359/584; 359/290

(58) Field of Classification Search .................... 216/2; 257/415; 359/290, 291, 584, 871, 872, 873
See application file for complete search history.

(56) References Cited

U.S. PATENT DOCUMENTS 6,587,613 B2 7/2003 De Natale ................... 385/18
6,618,184 B2 9/2003 Jin et al. ..................... 359/291
6,639,724 B2 10/2003 Bower et al. ............... 359/599
6,807,331 B2 * 10/2004 Hsu et al. ...................... 385/16
6,846,087 B2 * 1/2005 Carr et al. .................. 359/846
6,894,838 B2 * 5/2005 Mizrahi et al. ............. 359/584
7,075,103 B2 * 7/2006 Yan et al. ..................... 257/40
7,161,730 B2 * 1/2007 Floyd ......................... 359/291

OTHER PUBLICATIONS

Delano, Erwin, "Fourier Synthesis of Multilayer Filters", *Journal of The Optical Society Of America,* vol. 57, no. 12, 1967, Pp. 1529-1533.
Southwell, William H., "Using Apodization Functions To Reduce Sidelobes In Rugate Filters", *Applied Optics,* vol. 28, No. 23, 1989, pp. 5091-5094.
Bovard, Bertrand G., "Rugate Filter Design: The Modified Fourier Transform Technique", *Applied Optics,* vol. 29, No. 1, 1990, pp. 24-30.
Yoder, Lars, "The Digital Display Technology Of The Future", *Texas Instruments Incorporated,* 1997, pp. 1-11.
Gwynne, Peter, "MEMS Enables Fast, Reliable Optical Switching", *SPIE,* No. 200, 2000, pp. 1-3.
Maclood, H. Angue, "Thin-Film Optical Filters", Third Edition, *Institute of Physics Publishing,* 2001.
Douglass, Michael R., DMD Reliability: A MEMS Success Story, *SPIE,* vol. 4980, 2003.
Minott, George et al., "Rugate Notch Filters Find Use In Laser-Based Applications", Laser Focus World, 2004.

* cited by examiner

*Primary Examiner*—David N. Spector
(74) *Attorney, Agent, or Firm*—Koppel, Patrick, Heybl & Dawson

(57) ABSTRACT

A micromirror apparatus includes a device layer having a recess, a multilayer thin-film dielectric reflector coupled to and structurally supported by the device layer on the opposite side of the device layer from said recess, and a stress compensator seated in the recess, with the stress compensator operable to resist device layer bending moments resulting from intrinsic and thermal mismatch stresses between the multilayer thin-film dielectric reflector and the device layer.

22 Claims, 3 Drawing Sheets

FIG. 1
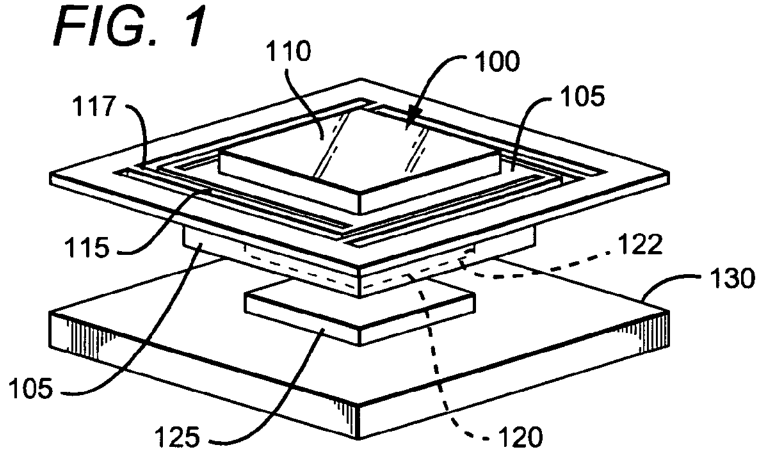
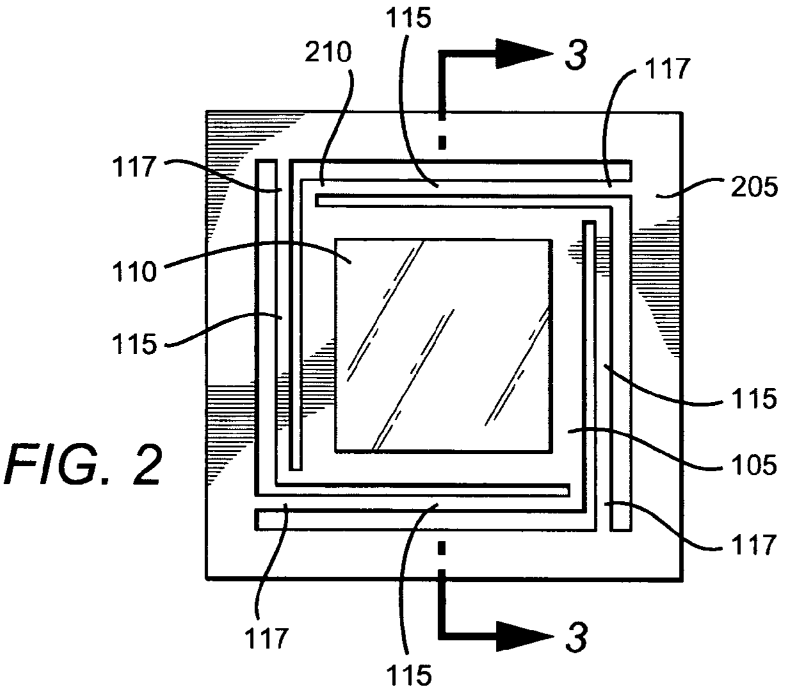
FIG. 2
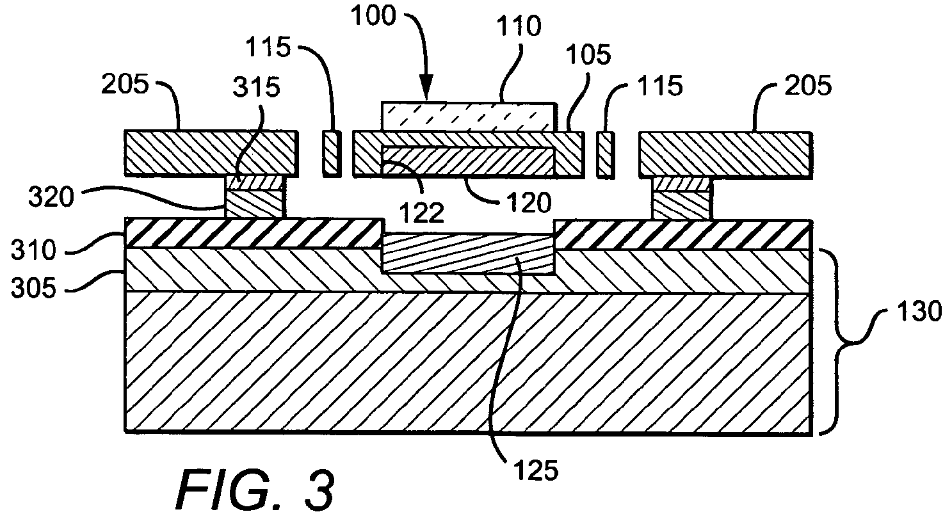
FIG. 3

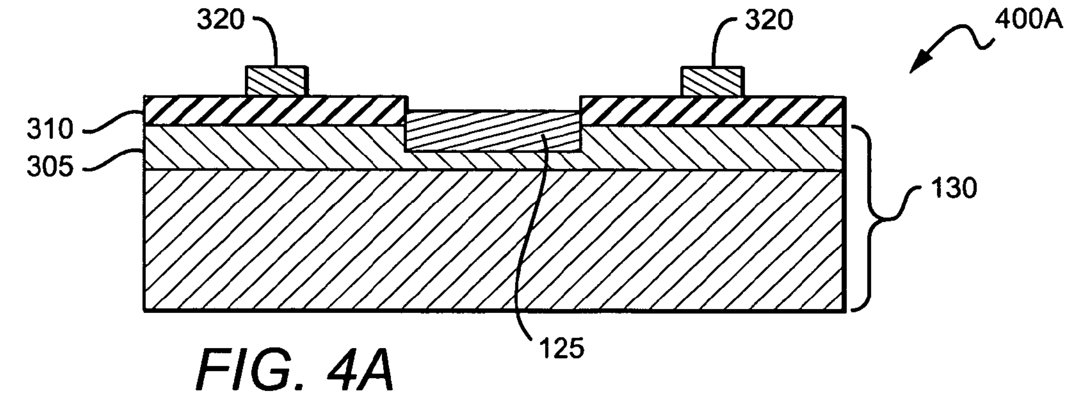
FIG. 4A
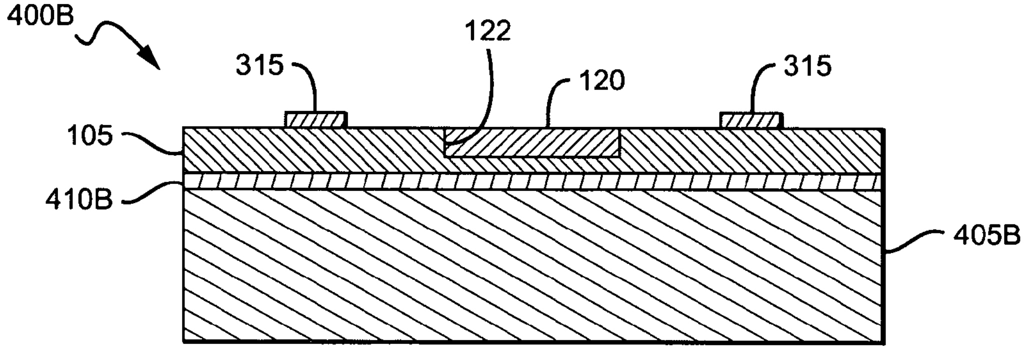
FIG. 4B
FIG. 4C
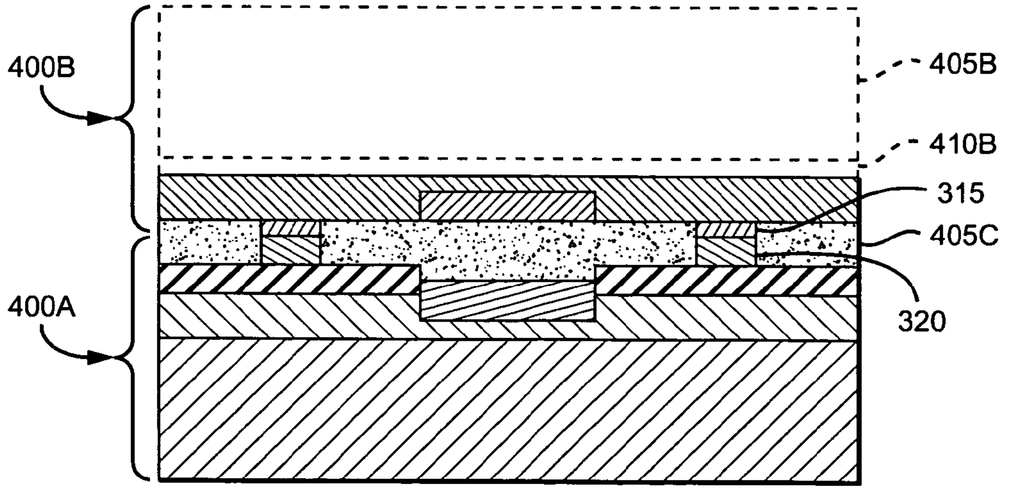

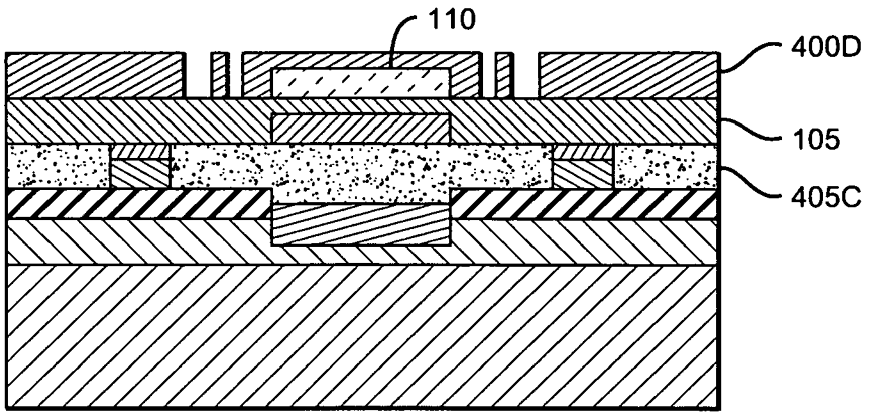
FIG. 4D
FIG. 4E
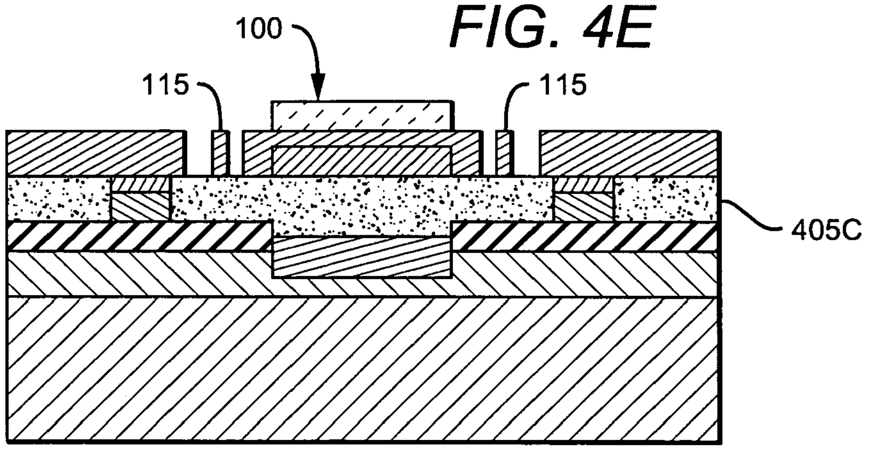
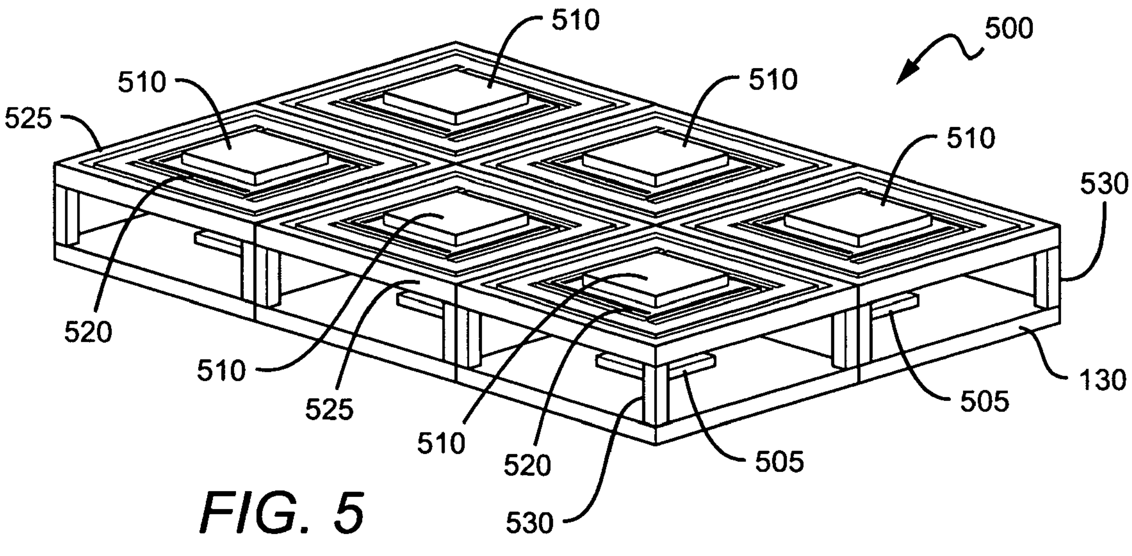
FIG. 5

THERMAL AND INTRINSIC STRESS COMPENSATED MICROMIRROR APPARATUS AND METHOD

BACKGROUND OF THE INVENTION

1. Field of the Invention

This invention relates to micromirrors, and more particularly, micromirrors used in micro electrical mechanical systems (MEMS) devices.

2. Description of the Related Art

Micromirrors are used in a variety of consumer and industrial devices, including wavefront correction arrays, digital projection displays and fiber optic switching. For example, micromirrors in digital light processing (DLP) televisions are used to turn light to the projection screen on and off at the pixel level to form a projected image. In fiber optic switches, micromirrors are used to steer light from one fiber to another for reconfigurable signal routing. In wavefront-correction arrays, micromirrors are translated relative to one another to correct for wavefront distortion in a propagating optical wave.

In general, it is desirable to have a micromirror reflect light with high efficiency and high fidelity. This imposes two common and desirable design characteristics on the micromirrors used in such applications: high reflectivity at the operating wavelength and high optical figure, otherwise known as mirror flatness. To achieve high reflectivity, reflective metal films are often deposited onto the microfabricated MEMS mirror. Unfortunately, intrinsic stress associated with the thin film deposition and thermal stresses arising from differences in coefficients of thermal expansion may compromise the mirror flatness for such micromirror assemblies. For example, some micromirrors incorporate deposited metal layers on a mechanical support microfabricated from materials such as polysilicon or single crystal silicon. Intrinsic stresses created during deposition and subsequent coalescence of the metal layers may result in deformation of the mirror structure. Thermal stresses introduced by differential expansion of the reflective and support layers, respectively, when introduced to environmental heating and cooling, may similarly result in mirror deformation. The problem is exacerbated as thinner structural supports are used for the mirror surface to accomplish quicker micromirror response.

A number of solutions exist for addressing the intrinsic and thermal mismatch stresses in micromirror assemblies that may lead to loss of mirror flatness. To minimize thermally induced distortion, constraints on the operating temperature of the device may be imposed. This adds considerable system-level complexity and associated cost. Similarly, the deformation induced by the thin film layer stresses may be reduced by measures such as reducing the thickness of the reflective metal film, reducing the lateral size of the micromirror itself to reduce the bending moment caused by the stress, or by tailoring the stresses in the metal layers used for the micromirror surface to achieve a stress-neutral state. In another solution, a double-layered metallization is used to deposit the same metallization in exactly the same thickness onto both the top and bottom surface of the mirror support, so that the metallization-induced stresses are balanced. (See U.S. Pat. No. 6,618,184). In yet another solution, a stress-balancing layer is formed on a side of the mirror support opposite to that of the light reflective optical layer, with the stress-balancing layer being the same material or a different material as the light reflective optical layer. (See U.S. Pat. No. 6,639,724)

Unfortunately, for some micromirror applications, such as high-intensity projectors or those subject to illumination by moderate-to high-energy lasers, the thin metal reflective layers may not have sufficient optical durability. The ability to use thicker metal reflective layers would improve the robustness and reliability of the micromirrors relative to those using thin metal layers. The thicker metal layers would, however, impose greater stress-induced deformation to the mirror relative to the thin layers. Similarly, micromirrors used in these high-intensity applications would benefit from the lower energy absorption (higher reflectivity) provided by non-metallic, multilayer thin-film dielectric mirrors. These multilayer dielectric reflectors may be quite thick, however, and may similarly exacerbate the stress-induced deformation of the micromirror. In those applications, reducing the thickness of the micromirror surface to reduce stress-induced deflection of the entire assembly is not possible without degrading the mirror's performance in the wavelength band of interest. Also, further reduction in reflecting area of the micromirror to reduce warping introduces manufacturing challenges for the typically thick, multi-layer dielectric mirrors.

A need exists, therefore, for a structure and method to reduce the deformation of micromirrors incorporating thick or complex optical coatings such as dielectric reflectors induced by intrinsic and thermal stresses without requiring a reduction in reflecting area of such micromirrors.

SUMMARY OF THE INVENTION

A micromirror apparatus is disclosed for use in micro electrical mechanical (MEMS) devices. It has a device layer having a recess, a multilayer thin-film dielectric reflector coupled to and structurally supported by the device layer on the opposite side of the device layer from said recess, and a stress compensator seated in the recess, with the stress compensator operable to resist device layer bending moments resulting from intrinsic and thermal mismatch stresses between the multilayer thin-film dielectric reflector and the device layer.

A micromirror apparatus is also disclosed that has two multilayer thin-film dielectric reflectors carried on opposite sides of the device layer with the second reflector seated in the device layer. Each of the reflectors shares a common linear thermal expansion coefficient to reduce warping of the device layer in response to intrinsic and thermal mismatch stresses between the first reflector and the device layer.

BRIEF DESCRIPTION OF THE DRAWINGS

The components in the figures are not necessarily to scale, emphasis instead being placed upon illustrating the principals of the invention. Like reference numerals designate corresponding parts throughout the different views.

FIG. 1 is a perspective view of a stress-compensated micromirror in accordance with one embodiment of the invention;

FIG. 2 is a top plan view of the embodiment of the invention illustrated in FIG. 1.

FIG. 3 is a cross-section view of the embodiment of the invention shown in FIG. 2 along the line 3-3.

FIGS. 4A-4E are cross-sectional views illustrating various stages of fabrication of the embodiment of the invention illustrated in FIG. 3;

FIG. 5 is a perspective view of an array of stress-compensated micromirrors in accordance with an embodiment of the invention; and

DETAILED DESCRIPTION OF THE INVENTION

A micromirror device is described that compensates for intrinsic and thermal mismatch stresses without resorting to disadvantageous reduction in the mirror's reflecting area or reflecting surface thickness. A stress compensator is seated in the support of a multilayer thin-film dielectric reflector (a "device layer") on a side opposite to that of the reflector. Mismatch stresses created between the stress compensator and the device layer are approximately equal to those mismatch stresses created between the multilayer thin-film dielectric reflector and the device layer, creating opposite bending moments and resulting in improved micromirror flatness both as-fabricated and during subsequent thermal environmental changes.

In one embodiment of the invention illustrated in FIG. 1, a micromirror assembly 100 has a device layer 105 providing structural support for a highly reflective micromirror reflective layer 110. The device layer 105 is preferably single-crystal silicon (Si), but can be any of a variety of materials used for the structural layers in a MEMS device, such as polysilicon, metals, or dielectric thin films, to allow fabrication of the micromirror assembly in standard surface or bulk micromachining processes. The micromirror reflector layer 110 is preferably a thin film reflector built up from multiple layers of dielectric materials. Highly reflective multilayer interference coatings comprised of dielectric thin films are well known, with the materials and thicknesses of the layers selected to achieve particular optical performance characteristics. Other materials and approaches can similarly be adopted to achieve the highly reflective surface. These may include thin or thick metal layers (individually or in combination, such as Au, Ag, Au/Ag) or metal-containing compounds (such as hydrides, nitrides, silicides, carbides, etc.) The device layer 105 provides a substantially planar structural support for the micromirror reflective layer 110.

Flexures 115 are connected to the device layer 105 and ultimately to a rigid base substrate 130 (connection not shown) (otherwise referred to as a "support substrate") to enable mechanical movement of the micromirror relative to the base substrate 130. These compliant flexures are typically designed to achieve particular mechanical characteristics, such as mechanical stiffness and resonant frequencies, commonly dictated by the application and other elements of the complete micromirror assembly. For the embodiment of a micromirror device illustrated in FIG. 1, which uses single crystal Si as the structural support for the reflective layer 100, the flexures 115 are formed from the Si device layer 105, and may further be thinned in an etching step to provide greater mechanical compliance than what would otherwise exist without such thinning. The flexures 115 allow elastic coupling of the micromirror assembly 100 to a fixed flexure support at a distal end 117 of the flexures 115. The fixed flexure support is preferably defined by a continuation of the etched device layer 105 (see 205, below) and flexures 115 and is itself coupled to the base substrate 130 (connection not shown).

A stress compensator, preferably a stress compensator layer 120, is formed on a side opposite to the reflector layer 110 and is formed partially seated in the device layer 105 to reduce the height of that portion of stress compensator layer 120 extending from the surface of the device layer 105. The material of the stress compensator layer 120 is preferably substantially similar to the material of reflector layer 110 so that a stress induced in the device layer 105 (which would also introduce a bending moment in such layer 105) as a result of intrinsic and/or thermal mismatch stresses between the reflector layer 110 and device layer 105 is opposed by approximately equal intrinsic and/or thermal mismatch stresses between the stress compensator layer 120 and device layer 105. More particularly, the reflector layer 110 and stress compensator layer 120 preferably have equal linear thermal expansion coefficients to accomplish the function of balanced thermal mismatch stresses. Similarly, the intrinsic stress associated with the stress compensator layer 120 should be substantially similar to that of the reflector layer.

Preferably, the stress compensator and reflector layers 120, 110 would have identical lateral dimensions, permitting identical 3D layer structures to be used for stress balancing. Differences between the lateral dimensions of the two may be required by the specific micromirror device design or process used, and in these cases slight differences in compensator thickness or fabrication process parameters may be used to accomplish a substantially similar intrinsic stress as that generated by the reflector layer. Similarly, for the thermal expansion stresses, the stress compensator layer 120 may accomplish the same function if composed of approximately the same volume fraction of the component materials as the reflector layer but may require different thicknesses to achieve the same thermal expansion stress as a function of temperature. For example, although illustrated in FIG. 1 as having the same dimensions as the reflector layer 110, the stress compensator layer 120 may have a greater thickness with a shorter lateral length or width to accomplish comparable stress characteristics as exists with the reflector layer 110. Similarly, the stress compensator layer 120 may be thinner than the reflector layer 110, but may have a greater width or length or both to accomplish comparable stress characteristics.

Also, although labeled as a "layer", if the reflector layer 110 is a thin film reflector, the stress compensator layer 120 would preferably be formed from multiple layers of dielectric materials similar to the reflector layer 110 to accomplish a comparable structure, material distribution and total thickness as exists with the reflector layer 110.

An electrode 125 sits on the base substrate 130 and is spaced apart from and in complementary opposition to the device layer 105. The electrode and device layer 105 function as electrically isolated counterelectrodes. Upon application of a voltage differential between them, the micromirror assembly 100 will mechanically deflect in an essentially vertical fashion with respect to the electrode 125. Upon removal of the voltage differential, the micromirror assembly 110/105/120 returns to its resting position by virtue of release of elastic energy stored in the compliant flexures. In the preferred embodiment, the mechanical deflection of the micromirror is accomplished using electrostatic actuation, although alternate actuation methods, such as thermal, piezoelectric, electromagnetic, Lorentz force, or others may be used without limitation within the scope of the invention. While the specific example described above is for a vertical-motion (piston) device, the present invention can apply equally well to a micromirror designed for one-axis tilt, two-axis tilt, or combined piston-tilt operation without limitation.

The plan view of FIG. 2 illustrates one implementation of the embodiment of the invention shown in FIG. 1. Flexures 115 are coupled on their distal ends 117 to a second portion of the device layer 205 for fixed structural support. The reflector layer 110 sits on a central portion of the device layer 105. During operation, the device layer 105 and reflector layer 110 are operable to translate together with respect to the second portion of the device layer 205 by means of compliant flexing between proximal and distal ends 210, 117 of the flexures 115. Although the flexures 115 are illustrated as having a rectangular cross section extending parallel with the device layer 105, they may be formed in a curved, perpendicular or other spatial arrangement with respect to the device layer second portion 205.

FIG. 3 illustrates one embodiment of a cross section taken along the line 3-3 in FIG. 2. The reflector layer 110 and stress compensator layer 120 are seated on opposite sides of the device layer 105. In the implementation of FIG. 3, the stress compensator layer 120 is seated in the recess 122 in the device layer to reduce the potential for mechanical impediment caused by the stress compensator layer translation within the gap between the base substrate 310 and device layer 105, the gap established in this embodiment by spacer layers 315 and 320. Complex multilayer coatings preferably used by the stress compensator and reflective layers 120, 110 may be characterized by significant physical thicknesses comparable to the dimensions of the device layer 105 and the gap distance between the device layer 105 and the electrode 125, and hence the recessing of the stress compensator layer 120 may be a critical element in preserving electromechanical functionality of the micromirror assembly 100. In the specific embodiment shown in FIG. 3, the recess 122 would be preferably formed by dry etch processes, although this feature could be formed by a variety of process methods known to those skilled in the art, and the preferred method of forming said recess would depend on the specific design and fabrication process chosen for the micromirror assembly. In one embodiment of the invention, flexures 115 are not thinned with respect to device layer 105 resulting in greater rigidity than what would otherwise exist with thinned flexures.

In a preferred embodiment, the mechanical deflection of the micromirror is accomplished using electrostatic actuation, although alternate actuation methods, such as thermal, piezoelectric, electromagnetic, Lorentz force, or others may be used without limitation within the scope of the invention.

A substrate electrode 305 is formed preferably on, or in, the base substrate 130 by conductive thin films, such as metals, or by suitably doping the substrate material to sufficiently low resistivity. In one embodiment, an insulating layer 310 sits on the substrate electrode layer 305 (not shown in FIG. 1) to prevent electrical shorting of the counter electrodes, should they come into physical contact. Such electrical isolation may be accomplished by other techniques known to those skilled in the art, such as the use of insulating standoffs. Alternate embodiments may have independently-addressable micromirror assemblies spaced in an array, which require electrically isolated bottom addressing electrodes. In such case, the bottom electrode would be electrically isolated from the device layer using dielectric layers. In the construction of the micromirror assembly 100, mechanical interconnection of the movable device layer 105 and stationary base substrate 130 is accomplished using the spacer layers 315, 320 as bonding elements. These simultaneously serve to establish the dimension of the gap between the movable and stationary elements of the assembly, and can also be used to accomplish electrical interconnection between the device layer 105 and electrical addressing connections on base substrate 130 (not shown). Such bonding can be accomplished by a number of different methods known to those skilled in the art. For the embodiment shown in FIG. 3, Au—Au thermocompression bonding is preferred. These mechanical bonding pads 315, 320 couple the device layer 105 to the oxide layer 310 such that the stress compensator layer 120 is positioned adjacent and opposite to the electrode 125. In the embodiment illustrated in FIGS. 1-3, the various elements of the micromirror assembly 100 have the approximate thickness and widths listed in Table 1. These values are exemplary only, and are not intended to limit the scope of the invention.

TABLE 1

| | Thickness (μm) | Width (μm) | Length (μm) |
|---|---|---|---|
| Device layer 105 | 20 | 100-400 | 100-400 |
| Micromirror 110 | 5-50 | 100-400 | 100-400 |
| Flexures 115 | 1-20 | 1-50 | 30-200 |
| Stress compensator layer 120 | 5-20 | 100-400 | 100-400 |
| Electrode 125 | 1-20 | 1-400 | 100-400 |
| Recess 122 | 5-20 | 105-395 | 105-395 |
| Base substrate | 400-800 | 100-400 | 100-400 |

While the specific embodiments described in FIGS. 1-3 incorporated electrostatic actuation to accomplish the mechanical displacement of the micromirror assembly, the present invention could equivalently employ alternate actuation mechanism within the scope of the invention. Such approaches may include, without limitation, thermal, piezoelectric, electromagnetic, Lorentz Force actuation as is known by those skilled in the art.

The use of multiple layers of dielectric thin films to create transmissive or reflective optical devices such as that preferably used by the reflective surface 110 is well known, and described in references such as: "Thin-Film Optical Filters, Third Edition", by H. Angus Macleod. IoP, 2001, or "Optical Interference Coatings," by Norbert Kaiser and H. K. Pulker, Editors. Springer, 2003.

Selection of the materials, thicknesses, and stacking sequences of these layers, provides great design flexibility in tailoring the optical response characteristics (for example transmission or reflection as a function of wavelength) of the device. One well-known multilayer dielectric stack configuration uses alternating layers of material with high optical index of refraction and low index of refraction, each at a thickness of one-quarter wavelength optical thickness at the desired operating wavelength. This layer structure will create a high optical reflectance at the design wavelength. In this structure, a quarter-wave optical thickness of high index material is denoted H and a quarterwave optical thickness of low index material is denoted L. The multilayer device structure of this device, referred to as a quarterwave stack, may be described by the notation:

$$\text{Incident medium}/(HL)^N H/\text{substrate} \tag{1}$$

Where $(HL)^N$ denotes N sequential pairs of quarterwave layers of the high and low-index materials. These devices are described in the references noted above. A key consideration in the implementation of these devices is that the level of the reflectance at the design wavelength increases with the number of sequential pairs, N.

Another type of optical thin film device is the gradient index, or rugate, filter. In these devices, sinusoidal variations in optical index of refraction as a function of thickness are created in the thin film structure. Fabrication processes such as controlled co-deposition of high-and low-index material or sequential deposition of digital approximations can be used to accomplish the desired index profiles. These devices are characterized by high levels of reflection over a narrow wavelength range, and are described in:

1. Rugate notch filters find use in laser-based applications, George Minott, Robert Sprague Boris Shnapir Way, Laser Focus World September, 2004.
2. Rugate Filter Design: The Modified Fourier Transform Technique, B. G. Bovard, Appl. Opt. 29, 24 (1990).
3. Fourier Synthesis of Multilayer Filters, E. Delano, J. Opt. Soc. Am. 57, 1529, (1967).
4. Using Apodization Functions to Reduce Sidelobes in Rugate Filters, W. H. Southwell and R. L. Hall, Appl. Opt. 28, 5091 (1989).

The level of reflectance of the rugate filter at the design wavelength will depend in part on the number of periods of the sinusoidal variation in index with thickness.

In both examples (quarterwave stack and rugate filter), the level of reflectance at the design wavelength will depend on the number of periodic cycles of index of refraction. Thus, to achieve higher levels of optical reflectivity one must use larger numbers of dielectric film layers, which results in greater total thicknesses for the thin film stack.

FIGS. 4A-4D illustrate various stages in the assembly and manufacture of the embodiment illustrated in FIG. 3. In FIG. 4A, the electrode 125 is deposited on top of the base substrate 130 for later alignment with its movable counter electrode (device layer 105 not shown). The mechanical bonding pads 320, which are Au in the preferred embodiment, sit on the oxide layer 310 in preparation for the next processing step. The various electrode 125 and metal bonding pads 315, 320 are preferably formed using a combination of process technologies such as dry etching, wet etching, and resist liftoff, as well known to those skilled in the art, to define a electrode intermediate assembly 400A. In FIG. 4B, a silicon on insulator (SOI) wafer is processed using the above-referenced techniques to introduce the stress compensator layer 120 into the device layer recess 122. The micromirror bonding pads 320 are coupled on the device layer 105 of the SOI wafer. A handling substrate 405B of the SOI wafer is available to move the micromirror intermediate assembly 400B from step to step during processing. In FIG. 4C, the micromirror intermediate assembly 400B is bonded to the electrode intermediate assembly 400A at the bonding pads 320, 315, respectively. An underfill material 405C is introduced between the intermediate assemblies 400A, 400B to provide structural support between them for subsequent processing steps. In the preferred embodiment, this underfill material is an organic epoxy, which is later removed using an oxygen plasma etching process. Other materials may be suitable for the underfill, provided their introduction, curing, and removal is compatible with the device fabrication process. The wafer handle 405B is removed (indicated by dashed lines) by a mechanical and dry-etch process down to the insulator oxide 410B. The insulator oxide 410B (indicated by dashed lines) is also removed with a standard wet etch process to strip it down to the device layer 105. As illustrated in FIG. 4D, the reflector layer 110 is deposited and patterned and the device layer 105 is patterned with a resist 400D to enable etching of the flexures. FIG. 4E illustrates the flexures 115 formed in the device layer 105 to allow movement of the micromirror 110 after removal of the organic epoxy 405C. The epoxy 405C is subsequently removed using an oxygen-plasma process. The abovementioned fabrication process is exemplary only, illustrating a preferred embodiment of the fabrication sequence. It is not intended to be limiting in the scope or application of the invention.

FIG. 5 illustrates an embodiment of a micromirror array 500 that uses the base substrate 130 with multiple and electrically independent electrodes 505 in complementary opposition to a plurality of respective micromirrors 510. Each micromirror 510 has a stress compensator (not known) separated from it by a device layer. Flexures 520 are coupled between second portions 525 of each respective device layer to allow piston-like movement of the micromirrors 510 in relation to the base substrate 130. Support columns 530, preferably formed from Au, provide mechanical interconnection of the micromirror array 500 to the supporting substrate 130. Alternate bonding processes may be used as known by those skilled in the art.

The supporting substrate 130 has been shown as a purely mechanical element in the embodiment described above. In an alternate embodiment, the supporting substrate may contain active electronic circuitry used to provide the electrical drive signals needed to actuate the individual mirror elements. For the case of electrostatically-actuated micromirrors, the circuitry would provide a varying voltage signal to control mirror deflection. In these embodiments, the materials and processes used for the micromirror-to-substrate bonding step would be selected to maintain compatibility with the restrictions of the circuit wafer.

While various implementations of the application have been described, it will be apparent to those of ordinary skill in the art that many more embodiments and implementations are possible that are within the scope of this invention.

What is claimed is:

1. A micromirror apparatus, comprising:

a device layer having a recess;

a multilayer thin-film dielectric reflector coupled to and structurally supported by said device layer on the opposite side of said device layer from said recess;

a stress compensator seated in said recess, said stress compensator operable to resist device layer bending moments resulting from intrinsic and thermal mismatch stresses between said multilayer thin-film dielectric reflector and said device layer.

2. The apparatus according to claim 1, wherein said stress compensator comprises a second multilayer thin-film dielectric reflector.

3. The apparatus according to claim 1, further comprising:

a flexure extending from said device layer.

4. The apparatus according to claim 3, wherein said flexure comprises a thinned extension of said device layer.

5. The apparatus according to claim 3, further comprising:

a mechanical support connected to said flexure, said flexure enabling movement of said device layer relative to said mechanical support.

6. The apparatus according to claim 5, further comprising:

a support column coupled to said mechanical support;

a supporting substrate coupled to said support column, said supporting substrate spaced adjacent to said stress compensator.

7. The apparatus according to claim 6, wherein said supporting substrate comprises and a first electrode.

8. The apparatus according to claim 7, wherein said device layer comprises a second electrode, so that application of a voltage differential between said first and second electrodes results in movement of said multilayer thin-film dielectric reflector.

9. The apparatus according to claim 6, wherein said support column comprises gold (Au).

10. The apparatus according to claim 1, wherein said device layer comprises an electrode.

11. The apparatus according to claim 1, wherein said device layer comprises a material selected from the group consisting of single-crystal silicon and polysilicon.

12. A micromirror apparatus, comprising:

a device layer having a recess;

first and second multilayer thin-film dielectric reflectors carried on opposite sides of said device layer, said second multilayer thin-film dielectric reflector seated in said recess in said device layer and having a common linear thermal expansion coefficient with said first multilayer thin-film dielectric reflector to reduce warping of said device layer in response to intrinsic and thermal mismatch stresses between said first multilayer thin-film dielectric reflector and said device layer.

13. The apparatus according to claim 12, further comprising a flexure extending from said device layer.

14. The apparatus according to claim 13, further comprising:

a flexure support connected by said flexure to said device layer, said flexure enabling movement of said device layer relative to said flexure support.

15. The apparatus according to claim 14, further comprising:

a support substrate coupled to said flexure support, said support substrate comprising active control circuitry to provide actuation of said first multilayer thin-film dielectric reflector.

16. The apparatus according to claim 14, further comprising:

a support substrate coupled to said flexure support, said support substrate comprising active control circuitry to provide electrostatic actuation of said first multilayer thin-film dielectric reflector.

17. The apparatus according to claim 12, wherein said support substrate further comprises an electrode.

18. A micromirror array, comprising:

a plurality of micromirror structures, each structure comprising:

a device layer having a recess;

a multilayer thin-film dielectric reflector coupled to and structurally supported by said device layer;

a stress compensator seated in said recess in the opposite side of said device layer from said multilayer thin-film dielectric reflector, said stress compensator operable to resist device layer bending moments resulting from intrinsic and thermal mismatch stresses between said micromirror and said substrate; and respective flexures extending from said device layers.

19. The array of claim 18, wherein each structure further comprises:

respective supports connected to said flexures, said flexures enabling movement of said device layers relative to said supports.

20. The array of claim 18, further comprising:

respective electrodes positioned to actuate movements of corresponding device layers in response to applied voltages between said electrodes and their respective device layers.

21. The array of claim 18, wherein at least one of said plurality of micromirror structures further comprises said multilayer thin-film dielectric reflector and said stress compensator sharing approximately equal linear thermal expansion coefficients to reduce warping of said respective device layer.

22. The array of claim 18, further comprising:

a base substrate which provides support for each of said electrodes.

* * * * *